United States Patent
Kamiya et al.

(10) Patent No.: US 7,868,918 B2
(45) Date of Patent: Jan. 11, 2011

(54) IMAGE STABILIZATION CONTROL CIRCUIT OF IMAGE PICKUP APPARATUS

(75) Inventors: Tomonori Kamiya, Ichinomiya (JP); Yoshihisa Tabuchi, Gifu (JP)

(73) Assignees: Sanyo Electronic Co., Ltd. (JP); Sanyo Semiconductor Co., Ltd. (JP)

( * ) Notice: Subject to any disclaimer, the term of this patent is extended or adjusted under 35 U.S.C. 154(b) by 309 days.

(21) Appl. No.: 12/202,871

(22) Filed: Sep. 2, 2008

(65) Prior Publication Data
US 2009/0141134 A1 Jun. 4, 2009

(30) Foreign Application Priority Data
Nov. 30, 2007 (JP) ............... 2007-310021

(51) Int. Cl.
*H04N 5/228* (2006.01)
(52) U.S. Cl. ................... 348/208.2; 348/208.4
(58) Field of Classification Search ......... 348/208.12–208.99; 396/55
See application file for complete search history.

(56) References Cited

U.S. PATENT DOCUMENTS

| | | | |
|---|---|---|---|
| 5,623,305 A | | 4/1997 | Ishizuka et al. |
| 7,522,188 B2 * | | 4/2009 | Tomita et al. ......... 348/208.11 |
| 7,529,476 B2 * | | 5/2009 | Kurosawa ............... 396/55 |
| 2005/0140793 A1 * | | 6/2005 | Kojima et al. ........ 348/208.99 |

FOREIGN PATENT DOCUMENTS

| EP | 0587432 A1 | 3/1994 |
|---|---|---|
| JP | 10-213832 | 8/1998 |

OTHER PUBLICATIONS

Chinese Office Action for Chinese Patent Application 200810128865.0 issued Nov. 20, 2009 with English translation.

* cited by examiner

*Primary Examiner*—Tuan Ho
(74) *Attorney, Agent, or Firm*—Cantor Colburn LLP

(57) ABSTRACT

An image stabilization control circuit comprises a plurality of vibration detecting elements for detecting vibration of an image pickup apparatus; a plurality of position detecting elements for detecting a position of an optical component; an analog/digital converter circuit for converting output signals of the plurality of vibration detecting elements and the plurality of position detecting elements to digital signals; and a logic circuit for generating a control signal for driving the optical component based on the output signals of the plurality of vibration detecting elements and the plurality of position detecting elements digitalized by the analog/digital converter circuit, wherein the analog/digital converter circuit digitalizes and outputs the output signal of the plurality of vibration detecting elements with respect to a plurality of axis directions, and successively digitalizes and outputs the output signal of the plurality of position detecting elements with respect to a plurality of axis directions.

3 Claims, 4 Drawing Sheets

IMAGE STABILIZATION CONTROL CIRCUIT OF IMAGE PICKUP APPARATUS

CROSS-REFERENCE TO RELATED APPLICATION

The entire disclosure of Japanese Patent Application No. 2007-310021 filed on Nov. 30, 2007 including specification, claims, drawings and abstract is incorporated herein by reference in its entirety.

BACKGROUND OF THE INVENTION

1. Field of the Invention

The present invention relates to an image stabilization control circuit incorporated in an image pickup apparatus.

2. Description of the Related Art

Recently, in image pickup apparatuses such as digital still cameras and digital video cameras, the number of pixels of an image sensing device provided therein is increased to achieve a higher image quality. Meanwhile, as another method of achieving a higher image quality in the image pickup apparatuses, it is desirable that the image pickup apparatuses are provided with a hand-shake correction function in order to prevent a blurred image of an object caused by shaking of the hand holding the image pickup apparatus.

To be specific, the image pickup apparatus comprises a detection element such as a gyro sensor or the like, and prevents a blurred image of an object by driving an optical component such as a lens and an image sensing device in response to an angular velocity component generated by vibration of the image pickup apparatus. Accordingly, even if the image pickup apparatus is shaken, a vibration component is not reflected in an obtained image signal, and an image signal of high image quality having no image blur can be obtained.

FIG. 4 is a block diagram of a conventional image stabilization control circuit 100 used for achieving the hand-shake correction function. The image stabilization control circuit 100 is provided in the image pickup apparatus, and operates according to control by a main control circuit (not shown) provided in the image pickup apparatus. The image stabilization control circuit 100 is connected to a position detecting element 102, a lens driving element 104, and a vibration detecting element 106.

The position detecting element 102 detects the position of a lens used in the image pickup apparatus. A hall element can be used as the position detecting element 102, and generates an induced current corresponding to an absolute position of the lens and outputs a voltage signal. A voice coil motor can be used as the lens driving element 104. The image stabilization control circuit 100 adjusts a voltage value applied to the lens driving element 104 to control the position of a moving coil of the voice coil motor, namely, the position of the lens with respect to a standard optical axis. The lens driving element 104 drives the lens in a plane perpendicular to the standard optical axis of the image pickup apparatus. The vibration detecting element 106 detects vibration of the image pickup apparatus and outputs the result to the image stabilization control circuit 100. A gyro sensor can be used as the vibration detecting element 106, which generates an angular velocity signal corresponding to vibration applied to the image pickup apparatus and outputs the angular velocity signal to the image stabilization control circuit 100.

It is preferable that the position detecting element 102, the lens driving element 104, and the vibration detecting element 106 are respectively constituted by at least two elements. For example, a plurality of elements for a horizontal component and a vertical component are provided in a plane perpendicular to the optical axis of the image pickup apparatus to detect the position of the lens, move the lens, and detect the vibration of the image pickup apparatus.

Next, the image stabilization control circuit 100 will be described in detail. The image stabilization control circuit 100 comprises a servo circuit 10, a lens driver 12, an analog-digital converter circuit (ADC) 14, a CPU 16, and a digital-analog converter circuit (DAC) 18.

The servo circuit 10 generates a signal for controlling the lens driving element 104 according to the voltage signal output from the position detecting element 102. The servo circuit 10 comprises an analog filter circuit having an external resistance element, a capacitor or the like, and generates a signal for controlling the lens driving element 104 such that the optical axis of the lens corresponds to the center of an image sensing device provided in the image pickup apparatus. The lens driver 12 generates a lens driving signal for driving the lens driving element 104 based on the signal output from the servo circuit 10.

The ADC 14 converts the analog angular velocity signal output from the vibration detecting element 106 to a digital signal. The CPU 16 generates an angle signal representing a moving amount of the image pickup apparatus based on the digital angular velocity signal. The CPU 16 is connected to a memory (not shown) and performs the processing of generating the angle signal based on software stored in the memory. The DAC 18 converts the digital angle signal generated in the CPU 16 to an analog signal.

The servo circuit 10 generates a lens driving signal for driving the lens driving element 104 according to a signal obtained by adding the analog angle signal output from the DAC 18 to the voltage signal output from the position detecting element 102. In other words, in order to prevent a blurred image of an object by hand-shake, the position of the lens is changed based on the angle signal representing the moving amount of the image pickup apparatus to suppress the blurring of an object image on the image sensing device. Accordingly, an image signal of high image quality can be obtained by suppressing the blurring of an object image by hand-shake.

In order to improve the degree of freedom for adjusting the image stabilization control circuit, it is desirable to replace the servo circuit and the processing circuits of the vibration detection signal with a logic circuit capable of digital processing. To be specific, if a mechanism of a digital camera in which the image stabilization control circuit is provided is changed, it is necessary to change an adjustment value of the image stabilization control circuit, and it is required that the adjustment can be easily performed. Moreover, since the image stabilization control circuit is incorporated in the image sensing device such as a digital camera and a lens module of the image sensing device, the image stabilization control circuit needs to be reduced in size as much as possible even when the logic circuit is employed therein.

SUMMARY OF THE INVENTION

One aspect of the present invention is an image stabilization control circuit, connected to a plurality of vibration detecting elements for detecting vibration of an image pickup apparatus with respect to each of at least two axis directions, and a plurality of position detecting elements for detecting a position of an optical component with respect to each of at least two axis directions, comprising an analog/digital converter circuit for converting output signals of the plurality of vibration detecting elements and the plurality of position detecting elements to digital signals, and a logic circuit for generating a control signal for driving the optical component based on the output signals of the plurality of vibration detecting elements and the plurality of position detecting elements digitalized by the analog/digital converter circuit, wherein each of a plurality of axis directions in which the plurality of vibration detecting elements detect vibration corresponds to each of a plurality of axis directions in which the plurality of position detecting elements detect a position of the optical component, the analog/digital converter circuit digitalizes and outputs the output signal of the plurality of vibration detecting elements with respect to one of the axis directions, and successively digitalizes and outputs the output signal of the plurality of position detecting elements with respect to an axis direction corresponding to the one of the axis directions, and the optical component of the image pickup apparatus is driven in response to the vibration to reduce an influence of the vibration on image picking up.

BRIEF DESCRIPTION OF THE DRAWINGS

Exemplary embodiment of the present invention will be described in detail on the following figures, wherein.

DESCRIPTION OF THE PREFERRED EMBODIMENT

Figure 1:
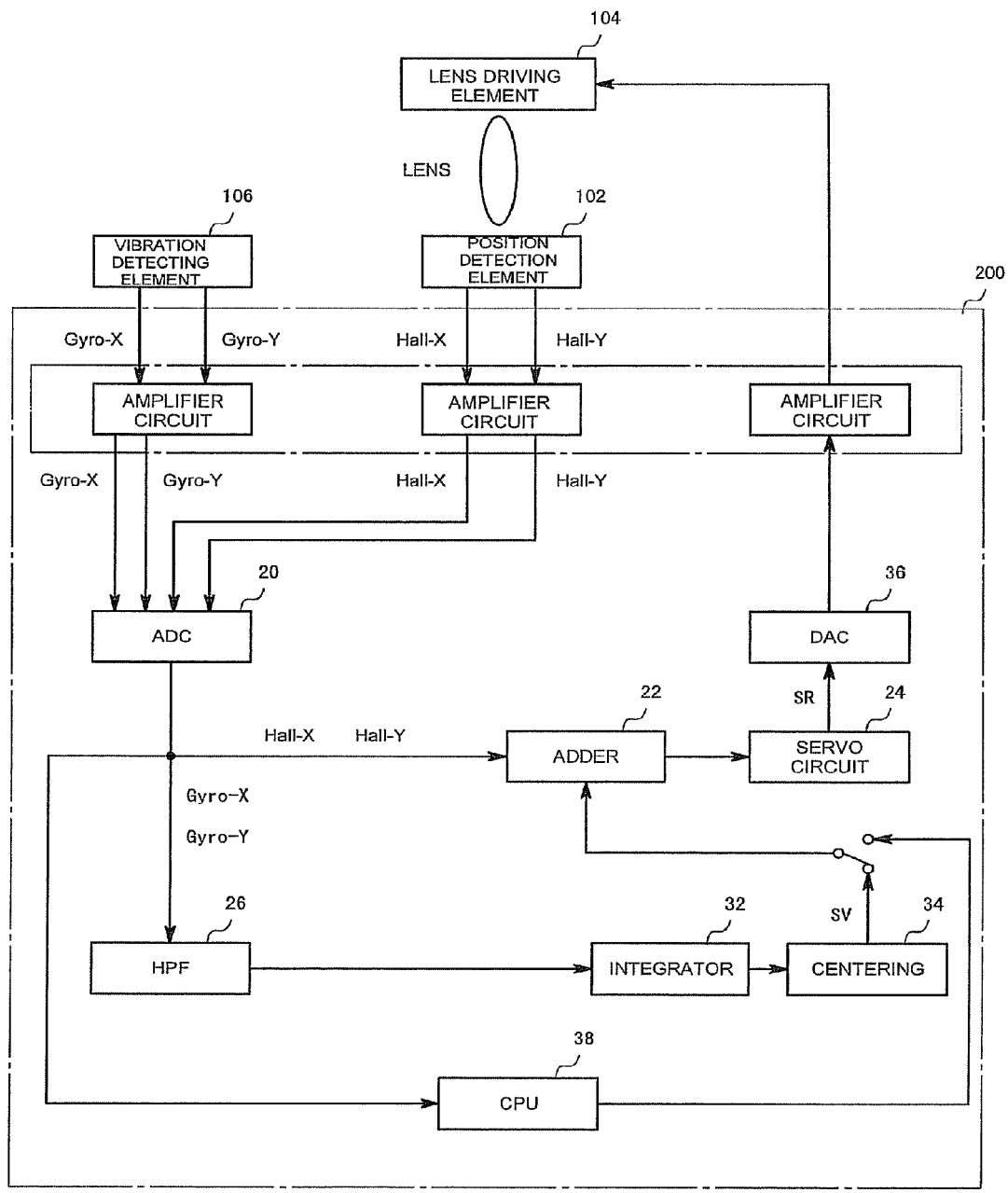
FIG. 1 is a view illustrating the configuration of an image stabilization control circuit according to an embodiment of the present invention.

As shown in a functional block diagram of FIG. 1, an image stabilization control circuit 200 according to an embodiment of the present invention comprises an analog/digital converter circuit (ADC) 20, an adder circuit 22, a servo circuit 24, a high-pass filter (HPF) 26, an integrator circuit 32, a centering circuit 34, a digital/analog converter circuit (DAC) 36, and a CPU 38.

The image stabilization control circuit 200 is connected to a position detecting element 102, a lens driving element 104, and a vibration detecting element 106. These elements are the same as those described in the related art. That is, the position detecting element 102 is provided with respect to at least two or more axes so as to measure the position of a lens driven by the lens driving element 104 such that the position of the lens can be at least orthogonally converted. Also, the vibration detecting element 106 is provided with respect to at least two or more axes such that a vibration component can be orthogonally converted along two axes in a yaw direction and a pitch direction.

The present embodiment will be described on the basis that the position detecting element 102 and the vibration detecting element 106 are disposed such that the position of the lens and the vibration can be detected with respect to the yaw direction (the x axis direction) and the pitch direction (the y axis direction) of an image pickup apparatus. In the following description, adding processing or the like of an output signal from the position detecting element 102 and an output signal from the vibration detecting element 106 is performed between X axis components, or between Y axis components, and the lens position is controlled in the yaw direction (the X axis direction) and the pitch direction (the Y axis direction) based on the processing with respect to the respective directions.

Moving the image pickup apparatus in the horizontal direction (the yaw direction) in response to the movement of an object or the like is called a pan operation, and moving the image pickup apparatus in the vertical direction (the pitch direction) is called a tilt operation.

The ADC 20 converts an analog voltage signal output from the position detecting element 102, for example, a hall element, to a digital signal. The hall element generates an induced current corresponding to a magnetic force of a magnet fixed to the lens. In other words, the hall element outputs a voltage signal representing the position of the lens depending on a distance from the lens, and the ADC 20 converts the voltage signal to a digital signal and outputs the digital signal as a position signal. The ADC 20 is configured to output a signal representing the base, for example, a digital value representing "0" when the optical axis of the lens corresponds to the center of an image sensing device provided in the image pickup apparatus.

Also, the ADC 20 converts an analog angular velocity signal output from the vibration detecting element 106, for example, a gyro sensor, to a digital signal. That is, the ADC 20 digitalizes and outputs the output signals from the position detecting element 102 and the vibration detecting element 106 by time division.

Figure 2:
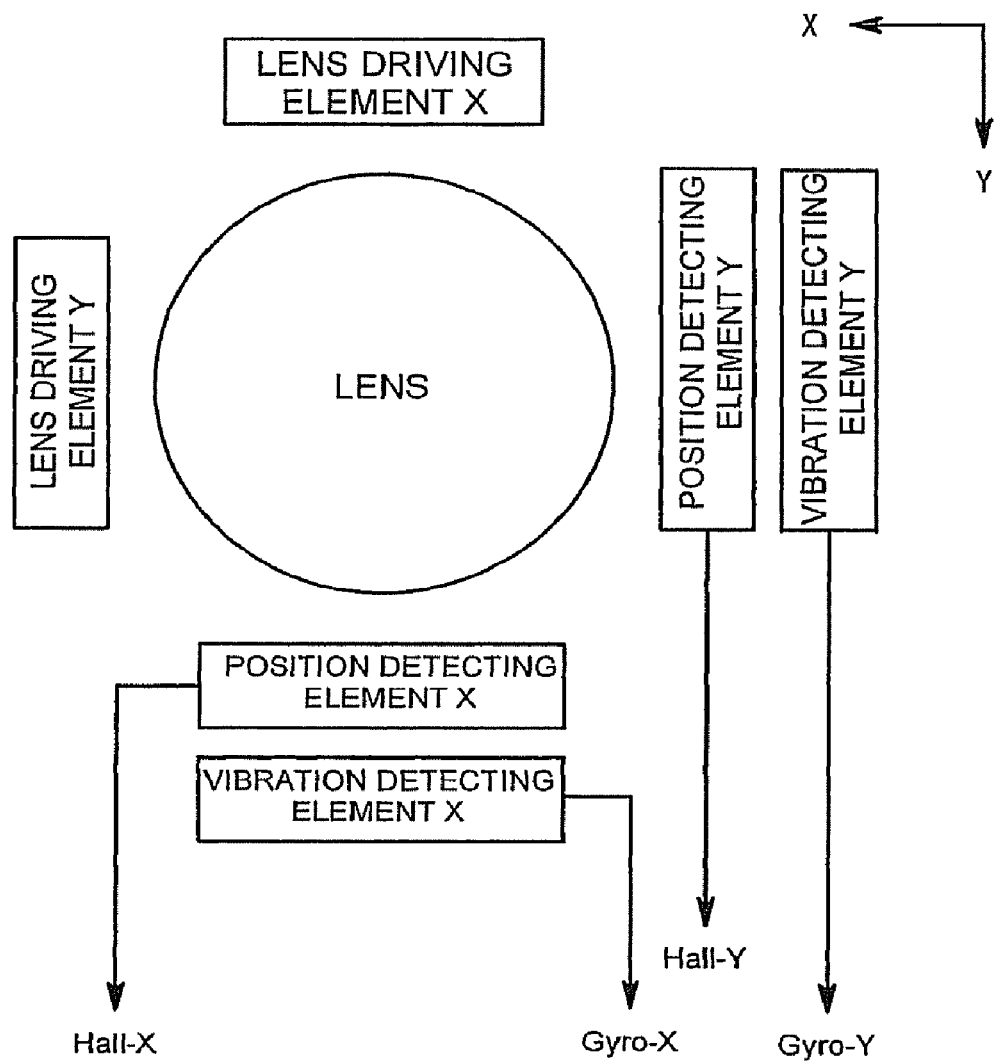
FIG. 2 is a view illustrating the relative arrangements of vibration detecting elements and position detecting elements according to the embodiment of the present invention.

To be specific, as shown in FIG. 2, the signals are digitalized and output in the order of the signal of the X axis component of the vibration detected by the vibration detecting element 106 (Gyro-X), the signal of the X axis component of the lens position detected by the position detecting element 102 (Hall-X), the signal of the Y axis component of the vibration detected by the vibration detecting element 106 (Gyro-Y), and the signal of the Y axis component of the lens position detected by the position detecting element 102 (Hall-Y). The ADC 20 outputs the signals (Gyro-X, Gyro-Y) to the HPF 26, and outputs the signals (Hall-X, Hall-Y) to the adder circuit 22.

The HPF 26 removes a direct current component included in the angular velocity signal output from the vibration detecting element 106, and extracts a high frequency component of the angular velocity signal in which the vibration of the image pickup apparatus is reflected.

The integrator circuit 32 integrates the angular velocity signal output from the HPF 26 and generates an angle signal representing a moving amount of the image pickup apparatus. The integrator circuit 32 preferably comprises a digital filter which is not shown, and calculates the angle signal, namely the moving amount of the image pickup apparatus, by performing filtering according to a filter coefficient set in a register which is not shown.

The centering circuit 34 generates a vibration component signal (SV-X, SV-Y) representing the moving amount of the image pickup apparatus by subtracting a predetermined value from the angle signal output from the integrator circuit 32. In the case where hand-shake correction processing is performed in the image pickup apparatus, the lens position gradually moves away from a standard position and reaches the vicinity of a limit of a movable range of the lens in some cases while the correction processing continues to be executed. If the hand-shake correction processing is continued at this time, the lens can move in only one direction and cannot move in the other directions. The centering circuit 34 is provided to prevent the above situation, and controls the lens so as not to easily move close to the limit of a movable range of the lens by subtracting a predetermined value from the angle signal.

The centering circuit 34 preferably comprises a digital filter which is not shown, and performs the processing of subtracting a predetermined value from the angle signal by performing filtering according to a filter coefficient set in a resister which is not shown.

The adder circuit 22 adds the vibration component signal of the X axis component (SV-X) generated in the centering circuit 34 to the position signal (Hall-X) output from the ADC 20, and also adds the vibration component signal of the Y axis component (SV-Y) generated in the centering circuit 34 to the position signal (Hall-Y) output from the ADC 20, to output the signal to the servo circuit 24.

The servo circuit 24 generates a correction signal SR for controlling drive of the lens driving element 104 according to the output signal from the adder circuit 22. The servo circuit 24 comprises a resister and a digital filter circuit, and performs filtering using a filter coefficient stored in the resister.

The DAC 36 converts the digital correction signal SR to an analog signal. The lens driving element 104 drives the lens of the image pickup apparatus respectively with respect to the X axis direction and the Y axis direction based on the correction signal SR analog-converted by the DAC 36.

Movement control of the lens for correcting a blurred image of an object by hand-shake using the image stabilization control circuit 200 shown in FIG. 1 will be described.

First, the case in which there is no blurred image of an object caused by hand-shake will be described. Since the position of the lens driven by the lens driving element 104 has the optical axis which corresponds to the center of the image sensing device provided in the image pickup apparatus, the ADC 20 outputs the digital position signal (Hall-X, Hall-Y) representing "0". When the value of the position signal (Hall-X, Hall-Y) is "0", the servo circuit 24 outputs the correction signal SR for controlling the lens driving element 104 of the X axis or the Y axis so as to maintain the present position of the lens.

When the position of the lens does not correspond to the center of the image sensing device, the ADC 20 outputs the digital position signal (Hall-X, Hall-Y) representing a value different from "0". The servo circuit 24 outputs the correction signal SR for controlling the lens driving element 104 of the X axis or the Y axis such that the value of the position signal (Hall-X, Hall-Y) becomes "0" depending on the value output from the ADC 20. By repeating the above operations, the position of the lens is controlled such that the position of the lens corresponds to the center of the image sensing device.

Next, the case in which a blurred image of an object is caused by hand-shake will be described. Since the position of the lens driven by the lens driving element 104 has the optical axis which corresponds to the center of the image sensing device provided in the image pickup apparatus, the ADC 20 outputs the digital position signal (Hall-X, Hall-Y) representing "0". On the other hand, since the image pickup apparatus is moved by hand-shake, the integrator circuit 32 and the centering circuit 34 output the vibration component signal (SV-X, SV-Y) representing the moving amount of the image pickup apparatus.

The servo circuit 24 generates the correction signal SR according to the signal obtained by adding the vibration component signal (SV-X) output from the centering circuit 34 to the position signal (Hall-X) representing "0" output from the ADC 20. Here, although the position signal (Hall-X) is "0", the vibration component signal (SV-X) which is not "0" is added thereto. Thus, the servo circuit 24 generates the correction signal SR for moving the lens. The lens driving element 104 of the X axis is controlled according to the correction signal SR. Similarly, the servo circuit 24 generates the correction signal SR according to the signal obtained by adding the vibration component signal (SV-Y) output from the centering circuit 34 to the position signal (Hall-Y) representing "0" output from the ADC 20. Here, although the position signal (Hall-Y) is "0", the vibration component signal (SV-Y) which is not "0" is added thereto. Thus, the servo circuit 24 generates the correction signal SR for moving the lens. The lens driving element 104 of the Y axis is controlled according to the correction signal SR. Since the lens driving element 104 moves the lens based on the correction signal SR output from the servo circuit 24, the image sensing device provided in the image pickup apparatus can obtain a signal in which the blurred image of an object by hand-shake is suppressed. By repeating such control, the image stabilization control circuit 200 achieves hand-shake correction control.

In the embodiment of the present invention, the angle signal representing the moving amount of the image pickup apparatus is generated from the angular velocity signal obtained from the vibration detecting element 106 by using the HPF 26, the integrator circuit 32 and the centering circuit 34. Accordingly, it is not necessary to use the CPU 38 for generating the angle signal, and power consumption in the image stabilization control circuit 200 can be reduced.

Also, in the embodiment of the present invention, the HPF 26, the integrator circuit 32 and the centering circuit 34 are provided in the image stabilization control circuit 200, and thus the circuit area can be reduced in comparison with the configuration in which the above processing is performed by the CPU 38. Accordingly, a semiconductor chip on which the image stabilization control circuit 200 is mounted can be reduced in cost.

Although the CPU 38 is mounted in the image stabilization control circuit 200, the CPU 38 is used for setting various filter coefficients included in the image stabilization control circuit 200 or a control parameter of the servo circuit 24, or the like. Therefore, the CPU 38 does not need to have a high performance, and one with a relatively small circuit area can be used.

Also, in the present embodiment, the ADC 20 digitalizes and outputs the output signals from the vibration detecting element 106 and the position detecting element 102 by time division. By performing such time-division processing, only one ADC needs to be incorporated, and the configuration of the image stabilization control circuit 200 can be further simplified.

Moreover, the ADC 20 digitalizes and outputs the signals in the order of the signal of the X axis component of the vibration detected by the vibration detecting element 106 (Gyro-X), the signal of the X axis component of the lens position detected by the position detecting element 102 (Hall-X), the signal of the Y axis component of the vibration detected by the vibration detecting element 106 (Gyro-Y), and the signal of the Y axis component of the lens position detected by the position detecting element 102 (Hall-Y).

Figure 3:
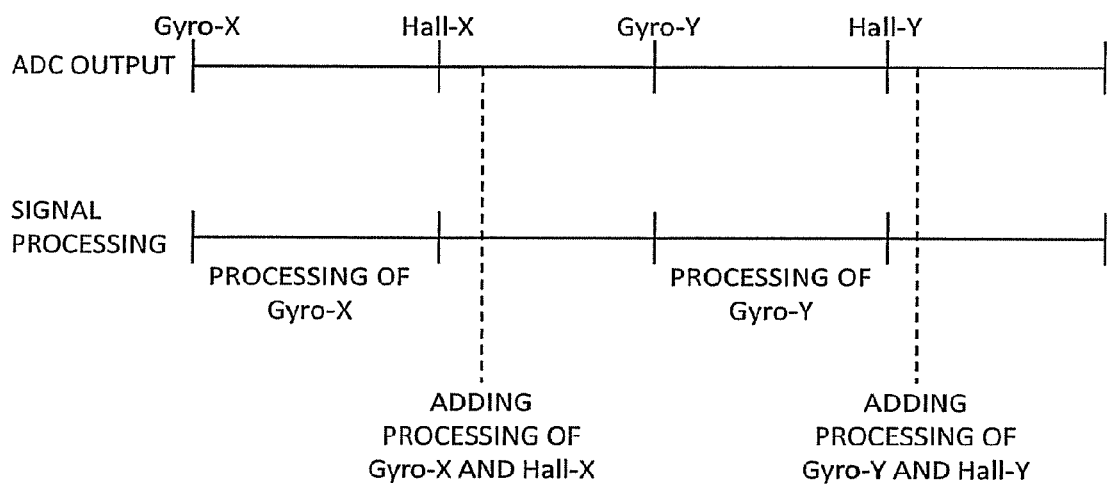
FIG. 3 is an explanatory view of an operation of signal processing according to the embodiment of the present invention.
Figure 4:
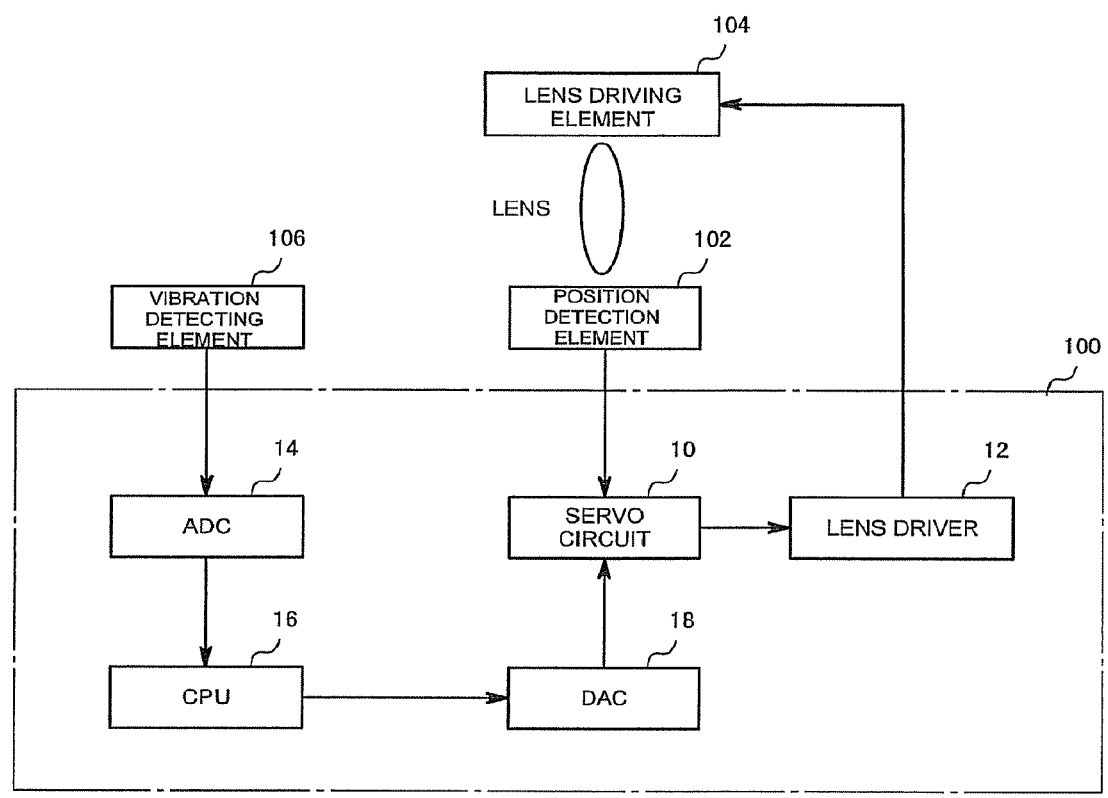
FIG. 4 is a view illustrating the configuration of an image stabilization control circuit according to a background art.

By outputting the signals in the above order, during a period from when the signal of the X axis component of the vibration detected by the vibration detecting element 106 (Gyro-X) is output from the ADC 20 until the signal of the X axis component of the lens position detected by the position detecting element 102 (Hall-X) is output, the signal of the X axis component of the vibration detected by the vibration detecting element 106 (Gyro-X) can be processed by the high-pass filter (HPF) 26, the integrator circuit 32 and the centering circuit 34 as shown in FIG. 3. As a result, the signal of the X axis component of the lens position (Hall-X) can be added thereto when not much time has elapsed after the detection of the signal of the X axis component of the vibration (Gyro-X) by the vibration detecting element 106. Accordingly, vibration prevention control with respect to the X axis of the lens can be accurately performed.

Similarly, during a period from when the signal of the Y axis component of the vibration detected by the vibration detecting element 106 (Gyro-Y) is output from the ADC 20 until the signal of the Y axis component of the lens position detected by the position detecting element 102 (Hall-Y) is output, the signal of the Y axis component of the vibration detected by the vibration detecting element 106 (Gyro-Y) can be processed by the high-pass filter (HPF) 26, the integrator circuit 32 and the centering circuit 34 as shown in FIG. 3. As a result, the signal of the Y axis component of the lens position (Hall-Y) can be added thereto when not much time has elapsed after the detection of the signal of the Y axis component of the vibration (Gyro-Y) by the vibration detecting element 106. Accordingly, vibration prevention control with respect to the Y axis of the lens can be accurately performed.

In the embodiment of the present invention, the hall element, the voice coil motor, and the gyro sensor are respectively used as the position detecting element 102, the lens driving element 104, the vibration detecting element 106. However, the present invention is not limited thereto. For example, a piezo element may be used as the lens driving element 104. Also, a sensor for detecting acceleration in a straight line direction may be used as the vibration detecting element 106 to detect the vibration of the image pickup apparatus based on an acceleration signal.

Also, in the embodiment of the present invention, a lens-shift method in which the hand-shake correction processing is performed by driving the lens is employed. However, the present invention is not limited thereto. For example, the present invention may be also applied to a CCD-shift method in which the image sensing device such as a CCD device or the like is shifted in response to shaking of the image pickup apparatus. At this time, the position detecting element 102 detects the position of the image sensing device, and an element for driving the image sensing device is used as the lens driving element 104.

What is claimed is:

1. An image stabilization control circuit,
connected to a plurality of vibration detecting elements for detecting vibration of an image pickup apparatus with respect to each of at least two axis directions, and a plurality of position detecting elements for detecting a position of an optical component with respect to each of at least two axis directions, comprising:
an analog/digital converter circuit for converting output signals of the plurality of vibration detecting elements and the plurality of position detecting elements to digital signals; and
a logic circuit for generating a control signal for driving the optical component based on the output signals of the plurality of vibration detecting elements and the plurality of position detecting elements digitalized by the analog/digital converter circuit, wherein
each of a plurality of axis directions in which the plurality of vibration detecting elements detect vibration corresponds to each of a plurality of axis directions in which the plurality of position detecting elements detect a position of the optical component,
the analog/digital converter circuit digitalizes and outputs the output signal of the plurality of vibration detecting elements with respect to one of the axis directions, and successively digitalizes and outputs the output signal of the plurality of position detecting elements with respect to an axis direction corresponding to the one of the axis directions, and
the optical component of the image pickup apparatus is driven in response to the vibration to reduce an influence of the vibration on image picking up.

2. The image stabilization control circuit according to claim 1, wherein
the plurality of axis directions are an X axis and a Y axis orthogonal to each other.

3. An image pickup apparatus having the image stabilization control circuit according to claim 2, comprising:
an optical component driving element connected to the image stabilization control circuit and the position detecting elements drives the optical component according to the control signal.

* * * * *